United States Patent
Takashima et al.

(10) Patent No.: US 9,580,847 B2
(45) Date of Patent: Feb. 28, 2017

(54) POROUS LAMINATE

(71) Applicant: CANON KABUSHIKI KAISHA, Tokyo (JP)

(72) Inventors: Kenji Takashima, Tokyo (JP); Tetsuo Hino, Yamato (JP); Kazuhiro Yamauchi, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/837,886

(22) Filed: Aug. 27, 2015

(65) Prior Publication Data

US 2016/0069005 A1    Mar. 10, 2016

(30) Foreign Application Priority Data

Sep. 4, 2014 (JP) ................. 2014-179814

(51) Int. Cl.
*D04H 1/728* (2012.01)
*D04H 1/4334* (2012.01)
(Continued)

(52) U.S. Cl.
CPC ............... *D04H 1/728* (2013.01); *B32B 5/022* (2013.01); *B32B 5/26* (2013.01); *D04H 1/4374* (2013.01);
(Continued)

(58) Field of Classification Search
CPC .............. B32B 5/14; B32B 5/32; B32B 5/022; B32B 2262/02; Y10T 428/249962; Y10T 428/249964; Y10T 428/249981
See application file for complete search history.

(56) References Cited

U.S. PATENT DOCUMENTS

2004/0223040 A1    11/2004   Graham et al.
2006/0154063 A1*   7/2006   Fujihara et al. ............. 428/373
(Continued)

FOREIGN PATENT DOCUMENTS

JP     2005-538863 A    12/2005
JP     2012-219384 A    11/2012

OTHER PUBLICATIONS

Polycaprolactone, Wikepedia, 4 pages [retrieved on Nov. 23, 2015]. Retrieved from the Internet <URL: https://en.wikipedia.org/wiki/Polycaprolactone>.*
(Continued)

*Primary Examiner* — Hai Vo
(74) *Attorney, Agent, or Firm* — Fitzpatrick, Cella, Harper & Scinto

(57) ABSTRACT

Provided is a porous laminate having satisfactory resistance to a mechanical load such as a bending stress while maintaining the characteristics of a porous structure. A porous laminate includes: a layer A formed on a support, the layer A including a porous film containing polymer nanofibers; and a layer B formed on the layer A, the layer B including a porous film containing polymer nanofibers, in which: an existence ratio of the polymer nanofibers contained in the layer A) is larger than an existence ratio of the polymer nanofibers contained in the layer B; and a difference between the existence ratio of the polymer nanofibers contained in the layer A and the existence ratio of the polymer nanofibers contained in the layer B is more than 40%.

4 Claims, 3 Drawing Sheets

(51) Int. Cl.
*D04H 1/4374* (2012.01)
*B32B 5/26* (2006.01)
*B32B 5/02* (2006.01)

(52) U.S. Cl.
CPC ........ *B32B 2262/02* (2013.01); *B32B 2305/02* (2013.01)

(56) References Cited

U.S. PATENT DOCUMENTS

| | | |
|---|---|---|
| 2009/0221047 A1* | 9/2009 | Schindler et al. ............ 435/160 |
| 2010/0292791 A1* | 11/2010 | Lu .......................... A61K 38/18 623/13.12 |
| 2015/0218324 A1 | 8/2015 | Hino et al. |
| 2015/0273366 A1 | 10/2015 | Takashima et al. |
| 2015/0273377 A1 | 10/2015 | Takashima et al. |
| 2015/0273812 A1 | 10/2015 | Takashima et al. |

OTHER PUBLICATIONS

Yasufuku et al., U.S. Appl. No. 14/879,227, filed Oct. 9, 2015.

\* cited by examiner

POROUS LAMINATE

BACKGROUND OF THE INVENTION

Field of the Invention

The present invention relates to a porous laminate, and more specifically, to a porous laminate in which a plurality of layers each containing polymer nanofibers are laminated.

Description of the Related Art

In recent years, a porous laminate, typified by a polymer nanofiber sheet, including a plurality of layers in which polymer nanofibers are accumulated and three-dimensionally entangled with each other has been attracting attention.

Unlike general fibers to be used for a nonwoven fabric or the like, one polymer nanofiber has a diameter of several microns or less. Therefore, a structural body formed of the polymer nanofibers is remarkably excellent as compared to a structural body formed of the general fibers in the point that a large specific surface area, a continuous pore structure of a nanosize, a low density, and the like are obtained, for example, when the polymer nanofibers are accumulated in a predetermined shape such as a sheet shape. With this, new functions such as mechanical strength, reactivity, electrical and optical characteristics, and permeability of an inside of a structural body can be imparted to the structural body formed of the polymer nanofibers. In particular, in the case of using a pore structure formed by accumulating the polymer nanofibers, a pore diameter of a submicron order can be obtained. In this respect, a structural member obtained by accumulating the polymer nanofibers is suitable for trapping and carrying fine particles. Further, the polymer nanofibers themselves are fibers each using an organic compound as a parent material, and hence are lightweight. Accordingly, the structural member obtained by accumulating the polymer nanofibers can be produced under a simple and inexpensive condition.

Incidentally, the structural member obtained by accumulating the polymer nanofibers utilizes the characteristics of the polymer nanofibers, and hence the structural member is used in a state of adhering to a support in most cases. In Japanese Patent Application Laid-Open No. 2005-538863, the above-mentioned structural member is used as an ink receiving layer by forming a layer formed of the polymer nanofibers on a surface of paper. Meanwhile, Japanese Patent Application Laid-Open No. 2012-219384 discloses a separator in which a nanofiber layer is bonded to a flexible base material such as paper. Japanese Patent Application Laid-Open No. 2012-219384 discloses that interfacial adhesiveness is enhanced by mixing nanobeads when bonding the base material and the nanofiber layer to each other.

However, a layer formed of the polymer nanofibers produced on a flexible support such as paper by the method disclosed in Japanese Patent Application Laid-Open No. 2005-538863 is delaminated from the support having the layer bonded thereto at an interface with respect to the support when a mechanical load such as a bending stress is applied to the support. As a result, the layer (polymer nanofiber layer) may be separated from the support. Meanwhile, although the procedure of Japanese Patent Application Laid-Open No. 2012-219384 can enhance the adhesiveness at the interface between the layer formed of the polymer nanofibers and the support, the nanobeads may clog a pore structure present in the layer formed of the polymer nanofibers. With this, a desired pore structure may not be obtained. Therefore, hitherto, a porous structural body having physical durability has not been obtained, which is not delaminated from the support even when a mechanical load such as a bending stress is applied to the support after production while maintaining the pore structure of the layer formed of the polymer nanofibers.

The present invention has been made so as to solve the above-mentioned problems, and it is an object of the present invention to provide a porous laminate having satisfactory resistance to a mechanical load such as a bending stress while maintaining the characteristics of a porous structure.

SUMMARY OF THE INVENTION

According to one embodiment of the present invention, there is provided a porous laminate, including:

a layer A formed on a support, the layer A including a porous film containing polymer nanofibers; and a layer B formed on the layer A, the layer B including a porous film containing polymer nanofibers, in which:

an existence ratio of the polymer nanofibers contained in the layer A is larger than an existence ratio of the polymer nanofibers contained in the layer B; and a difference between the existence ratio of the polymer nanofibers contained in the layer A and the existence ratio of the polymer nanofibers contained in the layer B is more than 40%.

Further features of the present invention will become apparent from the following description of exemplary embodiments with reference to the attached drawings.

DESCRIPTION OF THE EMBODIMENTS

Figure 1A:
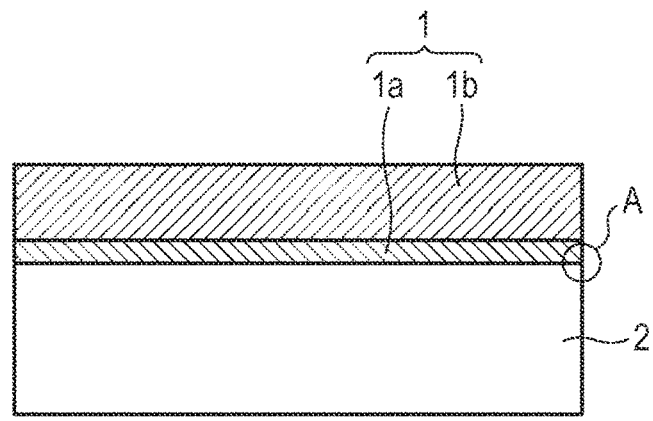
FIG. 1A is a schematic sectional view for illustrating an example of a porous laminate according to an embodiment of the present invention, laminated on a support.

A porous laminate of the present invention includes a layer A formed on a support, the layer A including a porous film containing polymer nanofibers, and a layer B formed on the layer A, the layer B including a porous film containing polymer nanofibers.

In the present invention, an existence ratio of the polymer nanofibers contained in the layer A is larger than an existence ratio of the polymer nanofibers contained in the layer B, and a difference between the existence ratio of the polymer nanofibers contained in the layer A and the existence ratio of the polymer nanofibers contained in the layer B is more than 40%.

Now, an embodiment of the present invention is described appropriately with reference to the drawings. It should be noted that the present invention is not limited to the embodiment described below. Further, well-known or known technologies in the art can be applied to portions that are not illustrated in the drawings or described in the following description.

(1) Porous Laminate

Figure 1B:
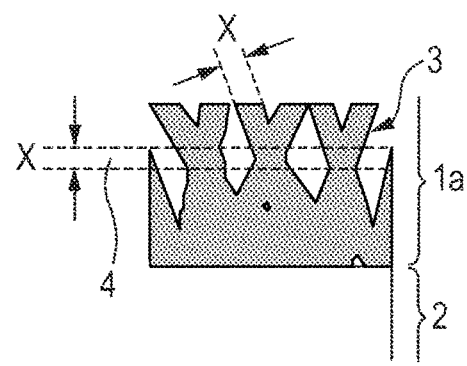
FIG. 1B is a partially enlarged view of a portion A encircled in FIG. 1A.

FIG. 1A is a schematic sectional view for illustrating an example of a porous laminate according to an embodiment of the present invention, laminated on a support, and FIG. 1B is a partially enlarged view of a portion A encircled in FIG. 1A.

A porous laminate 1 illustrated in FIG. 1A is formed on a support 2. Specifically, the porous laminate 1 includes a layer A 1*a* formed so as to be brought into contact with the support 2, the layer A 1*a* including a porous film containing polymer nanofibers 3, and a layer B 1*b* formed on the layer A 1*a*, the layer B 1*b* including a porous film containing polymer nanofibers.

(1-1) Polymer Nanofiber

The polymer nanofibers forming each of the layer A 1*a* and the layer B 1*b* are not particularly limited as long as the polymer nanofibers each contain at least an organic polymer component. A conventionally known polymer material can be used as the organic polymer (organic polymer compound) as a constituent material of the polymer nanofibers. In the present invention, as the organic polymer to be used as a constituent material of the polymer nanofibers, one kind of such materials may be used alone, or two or more kinds thereof may be used in combination. In addition, a polymer material containing fine particles or a conventionally known filler can be used as the organic polymer to be used as a constituent material of the polymer nanofibers.

It should be noted that the polymer nanofibers of the present invention are each a fiber including at least one kind of polymer, in which the length of the fiber is larger than the thickness of the fiber. Further, from the viewpoint of handling of the polymer nanofibers, it is preferred that, in the polymer nanofibers, the length of the fiber be 10 or more times as large as the thickness of the fiber.

In the present invention, the average diameter of the polymer nanofibers is preferably 1 nm or more and less than 10,000 nm. In particular, the average diameter is more preferably less than 1,500 nm in order to obtain a porous laminate having a high specific surface area, because the number of the fibers per unit space is limited when the fiber diameter is too large. It should be noted that when the average diameter of the polymer nanofibers is less than 1 nm, the polymer nanofibers themselves become difficult to handle from the viewpoint of producing the porous laminate. Meanwhile, from the viewpoint of the ease of handling of the polymer nanofibers, the average diameter is preferably 50 nm or more because the polymer nanofibers tend to be easy to handle.

The sectional shapes of the polymer nanofibers forming the porous laminate of the present invention are not particularly limited, and specific examples thereof include a circular shape, an elliptical shape, a quadrangular shape, a polygonal shape, and a semicircular shape. It should be noted that the sectional shape of each of the polymer nanofibers may not be a shape that can be defined clearly, and the shapes of a plurality of arbitrary sections of the polymer nanofiber may be different from each other. In the present invention, the thickness of the polymer nanofiber refers to a diameter of a section (circular section) in the case where the shape of the section of the polymer nanofiber is a circular shape. On the other hand, in the case where the shape of the section of the polymer nanofiber is not a circular shape, the thickness of the polymer nanofiber refers to the length of the longest straight line passing a center of gravity in any section of the polymer nanofiber.

In the present invention, the polymer material forming the polymer nanofibers is not particularly limited as long as the polymer material is capable of forming the porous laminate 1. Examples of the polymer material may include: a fluorine-containing polymer (such as tetrafluoroethylene or polyvinylidene fluoride; the fluorine-containing polymer may include a copolymer of a fluorine-containing polymer and any other monomer (such as a copolymer of PVDF and hexafluoropropylene (PVDF-HFP)); a polyolefin-based polymer (such as polyethylene or polypropylene); polystyrene (PS); a polyarylene (aromatic polymer such as poly-paraphenylene oxide, poly(2,6-dimethylphenylene oxide), or polyparaphenylene sulfide); a modified polymer obtained by introducing a sulfonic group (—SO$_3$H), a carboxy group (—COOH), a phosphoric group, a sulfonium group, an ammonium group, or a pyridinium group into a polyolefin-based polymer, polystyrene, polyimide, or a polyarylene (aromatic polymer); a modified polymer (such as a perfluorosulfonic acid polymer, a perfluorocarboxylic acid polymer, or a perfluorophosphoric acid polymer) obtained by introducing a sulfonic group, a carboxy group, a phosphoric group, a sulfonium group, an ammonium group, or a pyridinium group into a skeleton of a fluorine-containing polymer such as polytetrafluoroethylene; a polybutadiene-based compound; a polyurethane-based compound such as an elastomer-like one or a gel-like one; a silicone-based compound; polyvinyl chloride; polyethylene terephthalate; nylon; polyarylate; a biodegradable polymer (such as polycaprolactone (PCL) or polylactic acid); a polyether (such as polyethylene oxide (PEO) or polybutylene oxide); and a polyester (PES) (such as polyethylene terephthalate (PET)).

It should be noted that one kind of those polymer materials may be used alone, or a plurality of kinds thereof may be used in combination. In addition, in the polymer material other than the polyolefin-based polymer, polystyrene, polyimide, the polyarylene, and the fluorine-containing polymer, there may be used a modified polymer obtained by introducing a functional group (such as the above-mentioned sulfonic group, carboxy group, phosphoric group, sulfonium group, ammonium group, or pyridinium group). Further, a copolymer obtained by copolymerizing a plurality of kinds of monomers may be used. In addition, in the case of using a polymer material that is hardly caused to melt such as polyimide, polyamide, polyamide imide (PAI), or polybenzimidazole (PBI), the polymer material may be used in combination with, for example, a thermoplastic resin.

Of the above-mentioned polymer materials, a water-resistant polymer material is preferred in the present invention from the viewpoint of durability to moisture required in the case of use in the atmosphere. Further, of the above-mentioned polymer materials, a polymer material having a melting point of 80° C. or more is preferred from the viewpoint of preventing heat generation caused by the use in a high temperature area or the contact with another object.

As the polymer material serving as a constituent material of the polymer nanofibers according to the present invention, an organic material typified by a resin material, an inorganic material such as silica, titania, or a clay mineral, or a hybrid material of the organic material and the inorganic material may be used. Further, the material may be varied in the middle of the fiber. Specifically, a constituent material may be changed in a stage during formation of the layer A 1*a*, in a stage after formation of the layer A 1*a* and before formation of the layer B 1*b*, or in a stage during formation of the layer B 1*b*.

Examples of the inorganic material that may be incorporated into the polymer nanofibers in the present invention may include oxides of metal elements or semimetal elements selected from Si, Mg, Al, Ti, Zr, V, Cr, Mn, Fe, Co, Ni, Cu, Sn, and Zn. More specific examples thereof may include metal oxides such as silica (SiO$_2$), titanium oxide, aluminum oxide, alumina sol, zirconium oxide, iron oxide, and chromium oxide. In addition, a clay mineral such as montmorillonite (MN) may be used. It should be noted that a case where the inorganic material is contained in the polymer nanofibers is preferred from the viewpoint of an improvement in durability as long as a pore image is obtained in a desired state, because a mechanical strength tends to increase significantly upon joining of the polymer nanofibers.

Further, in the case where the polymer material forming the polymer nanofibers has an imide structure, the polymer material tends to have a high mechanical strength in addition to heat resistance by virtue of the rigid and strong molecular structure of the imide structure. Accordingly, a porous laminate that hardly deforms and has a high specific surface area tends to be obtained. In addition, due to the above-mentioned material configuration, the mechanical strength of the porous laminate of the present invention tends to increase significantly, which is preferred from the viewpoint of the improvement in durability.

(1-2) Existence Ratio of Polymer Nanofibers Contained in Each Layer

As a quantitative indicator of a local structure of the porous laminate 1 of the present invention, there is an existence ratio expressed by a ratio of a volume of the polymer nanofibers to a volume (including a void portion) of a layer. The existence ratio has a plurality of definitions depending on the manner of determining a ratio of a volume of the polymer nanofibers. Specific examples thereof include a unit existence ratio and an average existence ratio. The unit existence ratio refers to an area ratio occupied by the fibers in a thickness area in a lamination direction equal to a fiber diameter (X in FIG. 1B) in a predetermined fracture section of the porous laminate 1, specifically, in an area denoted by reference numeral 4 of FIG. 1B. The average existence ratio refers to an average value of the unit existence ratio in a thickness of a particular portion. In the following description, unless otherwise specified, the existence ratio refers to an average existence ratio of a target portion. In the present invention, the existence ratio of the polymer nanofibers in the layer A 1a is larger than an existence ratio of the polymer nanofibers in the layer B 1b, and a difference in existence ratio of the polymer nanofibers between the two layers is more than 40%. It should be noted that the existence ratio of the local polymer nanofibers in the layer may be constant or may be varied in the lamination direction in both the layer A 1a and the layer B 1b.

In the present invention, the existence ratio (average existence ratio) of the polymer nanofibers in the layer A 1a is preferably 70% or more and 97% or less, more preferably 80% or more and 97% or less. When the existence ratio of the polymer nanofibers in the layer A 1a is less than 70%, the contact amount of the polymer nanofibers with respect to the support 2 decreases, and hence the adhesiveness of the porous laminate 1 with respect to the support 2 is degraded. On the other hand, when the existence ratio of the polymer nanofibers is more than 97%, pore portions are hardly formed in the layer A 1a, and hence the air permeability to be kept by the porous laminate 1 is degraded.

In the present invention, the existence ratio (average existence ratio) of the polymer nanofibers in the layer B 1b is preferably 10% or more and 45% or less, more preferably 15% or more and 35% or less. When the existence ratio of the polymer nanofibers in the layer B 1b is less than 10%, the amount of the polymer nanofibers contained in the layer B 1b decreases, and hence the effect of the layer B 1b of trapping and carrying a substance of a submicron size is reduced. On the other hand, when the existence ratio of the polymer nanofibers is more than 45%, the amount of pore portions contained in the layer B 1b is decreased, and hence the effect of the layer B 1b of trapping and carrying a substance of a submicron size is also reduced.

In the present invention, regarding the average fiber diameter of each layer (layer A 1a, layer B 1b) forming the porous laminate 1, it is desired that the average fiber diameter of the polymer nanofibers contained in the layer A 1a be equal to or more than that of the polymer nanofibers contained in the layer B 1b. This is because, in the case where the average fiber diameter of the polymer nanofibers contained in the layer B 1b is larger, the adhesiveness of the layer B 1b with respect to the layer A 1a is degraded.

In the porous laminate 1 of the present invention, an area, in which neither the polymer nanofibers nor a section containing an accumulated polymer portions not having a nanofiber shape exists, serves as a pore (void) capable of taking in air. In the present invention, the pore refers to a void space formed by a plurality of adjacent polymer nanofibers or a plurality of adjacent polymer portions not having a nanofiber shape in the case where the polymer nanofibers or the polymer portions are not in contact with each other. Herein, the length of a smallest portion in an unspecified pore is defined as a partial pore diameter. In the case where even a small void cannot be formed because the plurality of the polymer nanofibers are in close contact with each other, that portion is not called a pore. Therefore, the partial pore diameter has a value larger than zero. In the present invention, the average pore diameter is an average value of partial pore diameters in a specified space. The average pore diameter is not particularly limited as long as the porous laminate 1 maintains delamination resistance, and it is desired that the average pore diameter of the layer A 1a be less than the average pore diameter of the layer B 1b. In the case where the average pore diameter of the layer B 1b is equal to or less than that of the layer A 1a, the delamination resistance of the inside of a structural body is decreased. The average pore diameter of the layer B 1b, which is not particularly limited, is preferably 10 nm or more and less than 50,000 nm. In particular, in the case of using the porous laminate 1 as a separator of a substance of a submicron size, the average pore diameter of the layer B 1b is more preferably less than 10,000 nm. When the average pore diameter of the layer B 1b is less than 10 nm, there is a risk in that moisture in gas may clog pores through a capillary phenomenon when adhering to the layer B 1b as liquid droplets. On the other hand, when the average pore diameter of the layer B 1b is 50,000 nm or more, a space is too large for the diameter of the polymer nanofibers. Therefore, the strength is decreased, and the function of trapping and carrying fine particles and the like is degraded.

The polymer nanofibers contained in each layer (1a, 1b) forming the porous laminate 1 of the present invention may be accumulated randomly or may be accumulated in a state in which the number of the polymer nanofibers with the length direction being oriented in a particular direction is large.

In the present invention, an interface between the layer A 1a and the layer B 1b refers to a portion in which the existence ratio of the polymer nanofibers first becomes less than 60% from the support 2 to the surface of the layer B 1b. It should be noted that, in the case where the interface between the layer A 1a and the layer B 1b is unclear, a portion of 10% of the distance from the support 2 to the surface of the layer B 1b, that is, the entire thickness of the porous laminate 1 is defined as the interface between the layer A 1a and the layer B 1b. The porous laminate 1 of the present invention uses the characteristics of the layer B 1*b* serving as a surface layer. Therefore, when the ratio of the layer A 1*a* is large, the physical properties of the layer A 1*a* may significantly influence the layer B 1*b*, and thus a desired effect of the porous laminate 1 may not be obtained.

In the present invention, the thickness of the layer A 1*a*, which is not particularly limited, is preferably 100 nm or more and 30 μm or less, more preferably larger than the average fiber diameter of the polymer nanofibers forming the layer B 1*b* and 20 μm or less. In the case where the thickness of the layer A 1*a* is less than 100 nm, there is a risk in that the adhesiveness of the layer A 1*a* with respect to the layer B 1*b* may be degraded. On the other hand, in the case where the thickness of the layer A 1*a* is more than 30 μm, the physical properties of the layer A 1*a* significantly influences the use of the characteristics of the layer B 1*b* when the layers are used as the porous laminate 1, and thus a desired effect may not be obtained.

In the present invention, the thickness of the layer B 1*b*, which is not particularly limited, is preferably 50 nm or more and 500 μm or less, more preferably larger than the average fiber diameter of the polymer nanofibers forming the layer B 1*b* and 200 μm or less. In the case where the thickness of the layer B 1*b* is less than 50 nm, the effect peculiar to the polymer nanofibers of trapping fine particles and the like is not exhibited. On the other hand, it is not preferred that the thickness of the layer B 1*b* be more than 500 μm because the operability at a time of using the porous laminate 1 in a state of adhering to the support 2 or the like is degraded.

(1-3) Support

In the present invention, the support 2 to be used for forming the porous laminate 1 is by no means limited, and for example, a thin and flexible material (such as a film, paper, or a metal foil) can be used. More specifically, an organic material typified by a resin material or an inorganic material such as silica or titania can be used. Further, a hybrid material obtained by mixing the organic material and the inorganic material can be used. Further, the material for a member to be the support 2 may be varied in the middle, and a member at least partially including a hollow structure, a porous structure, or the like may be used as the support 2.

[Method of Producing Porous Laminate]

The porous laminate of the present invention is produced by spinning polymer nanofibers forming a structural body by an electrospinning method and accumulating the spun polymer nanofibers. In the present invention, spinning of the polymer nanofibers is performed through a 2-stage process described below:

(i) a step of spinning a polymer solution (or a polymer melt solution) while setting a difference in voltage value between a discharging portion and a trapping portion of the polymer solution outside of an optimum numerical range for producing polymer nanofibers; and (ii) a step of spinning the polymer solution (or the polymer melt solution) while adjusting the difference in voltage value between the discharging portion and the trapping portion of the polymer solution within the optimum numerical range for producing polymer nanofibers.

It should be noted that the phrase "outside of an optimum numerical range" as described in the above-mentioned item (i) has the same meaning as "larger than an optimum numerical range."

It should be noted that, in the present invention, upon production of the porous laminate, the porous laminate may be produced by a production method other than an electrospinning method (electric field spinning, electrostatic spinning), for example, a production process combined with a melt-blow method or the like. Now, a method of producing a porous laminate using the electrospinning method is mainly described.

The electrospinning method is a method of producing polymer nanofibers, which involves applying a high voltage between the polymer solution in a syringe and a collector electrode, thereby extruding the polymer solution from the syringe. When this method is adopted, the solution extruded from the syringe is provided with charge to scatter in an electric field, but a solvent in the scattered solution evaporates, and as a result, the solution itself is gradually thinned. The thinned solution becomes polymer nanofibers to adhere to a collector. Further, the electrospinning method is preferred as a specific method of producing a porous laminate of the present invention because of having the following features (a) to (d):

(a) various polymers can be spun into fiber shapes;
(b) it is relatively easy to control a fiber shape;
(c) a fiber having a size ranging from several nanometers to several tens of micrometers can be easily obtained; and
(d) a production process is simple.

Figure 2:
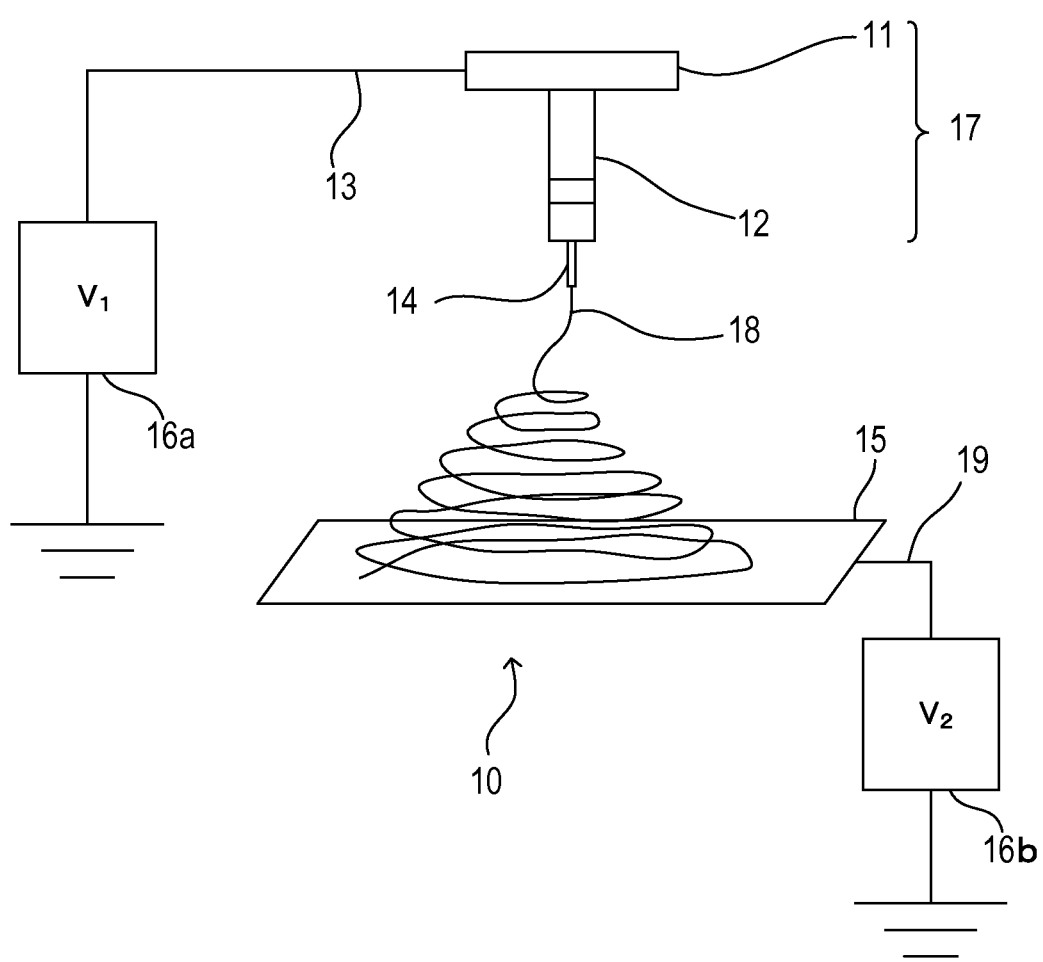
FIG. 2 is a schematic view for illustrating an example of an apparatus for producing a porous laminate of the present invention.

FIG. 2 is a schematic view for illustrating an example of an apparatus for producing a porous laminate of the present invention. A production apparatus 10 illustrated in FIG. 2 specifically adopts a method involving extruding a polymer solution stored in a storage tank 12 from a spinning nozzle 14. It should be noted that the polymer solution extruded from the spinning nozzle 14 scatters in various directions and hence a polymer nanofiber sheet in which spun polymer nanofibers are three-dimensionally entangled with each other is naturally produced. Accordingly, there is no need to twist the spun polymer nanofibers in a later step.

Next, constituent members of the production apparatus 10 of FIG. 2 are described. A storage tank 12 configured to store a polymer solution is arranged through intermediation of a connecting portion 11. It should be noted that the connecting portion 11 is electrically connected to a high-voltage power source (upper power source 16*a*) capable of freely outputting a minus or plus high-voltage through a wiring 13 and is directly connected to the ground in the case where the voltage is zero. In addition, the connecting portion 11 and the storage tank 12 are each a constituent member for a head 17. A collector 15 on which the spun polymer nanofibers are collected is arranged so as to face the head 17 with a certain interval therebetween. It should be noted that the collector 15 is electrically connected to a high-voltage power source (lower power source 16*b*) capable of freely outputting a minus or plus high-voltage through a wiring 19 and is directly connected to the ground in the case where the voltage is zero.

The polymer solution is extruded from the storage tank 12 to the spinning nozzle 14 at a constant rate. In this case, a voltage $V_1$ of, for example, from −50 kV to 50 kV is applied to the spinning nozzle 14 by the upper power source 16*a*, and a voltage $V_2$ of, for example, from −50 kV to 50 kV is applied to the collector 15 by the lower power source 16*b*. When electrical attraction caused by the application of the voltages by the two power sources exceeds the surface tension of the polymer solution, a jet 18 of the polymer solution is jetted toward the collector 15. At this time, a solvent in the jet gradually volatilizes, and upon arrival at the collector 15, a corresponding polymer nanofiber is obtained. Herein, basically, the polymer solution set to a condition under which the polymer solution is turned into nanofibers is introduced into the storage tank 12 and spun. In particular, upon production of the polymer nanofibers forming the layer A 1a, it is not required that the solvent volatilize to be removed completely when the polymer nanofibers arrive at the collector 15.

It should be noted that what is stored in the storage tank 12 upon spinning is not limited to the polymer solution and a molten polymer heated to its melting point or more may be utilized.

FIG. 2 is a view for illustrating the manner of forming the polymer nanofibers directly on the collector 15. However, as illustrated in FIG. 1A, in the case where the porous laminate 1 is produced on a desired base material 2, the base material 2 is set on the collector 15 in advance.

In the case of producing polymer nanofibers by the electrospinning method, the structural characteristics such as a fiber diameter of each of the polymer nanofibers, an existence ratio, an average pore diameter, and a void ratio (of the fibers) in a structural body in which the polymer nanofibers are accumulated depend on production conditions. Specifically, the structural characteristics significantly depend on the kind of a polymer, a mixed additive and the ratio thereof, the viscosity of the polymer solution, the temperature and humidity during production, and the spinning condition. Further, the spinning condition is significantly influenced by, in particular, the extrusion speed of the polymer solution from the storage tank 12 to the spinning nozzle 14, the voltage $V_1$ of the upper power source 16a, and the voltage $V_2$ of the lower power source 16b. Further, the voltages ($V_1$, $V_2$) of the upper power source 16a and the lower power source 16b are appropriately adjusted with the kind of a polymer material to be used and the concentration of the polymer solution. The fiber diameter and accumulation behavior in the structural body are changed by appropriately controlling the voltages ($V_1$, $V_2$) during spinning.

In the present invention, when the layer A 1a is formed, a minus high-voltage is preferably applied by the lower power source 16b. When a minus high-voltage is applied by the lower power source 16b during production of the polymer nanofibers forming the layer A 1a, a potential difference between the spinning nozzle 14 and the collector 15 becomes larger than that suitable for producing the polymer nanofibers because the application voltage of the upper power source 16a is generally a plus voltage. As a result, the amount of the polymer nanofibers that arrive at the collector 15 in a state of containing a solvent gradually increases while the polymer nanofibers are being produced during formation of the layer A 1a.

The detail of this mechanism is not clear, but the following is considered. Under the optimum spinning condition of the polymer nanofibers, the polymer nanofibers discharged from the spinning nozzle 14 scatter widely in a space and arrive at the collector 15 over time. Therefore, the solvent contained in the polymer nanofibers at a time of discharge volatilizes sufficiently. In contrast, when the above-mentioned optimum spinning condition is removed by applying a minus voltage from the lower power source 16b when the layer A 1a forming the porous laminate 1 is formed, an electric field generated between the spinning nozzle 14 and the collector 15 becomes stronger. Then, the jet 18 of the polymer solution is attracted to the collector 15 with a force that is stronger than that under the optimum spinning condition. With this, a period of time during which the jet 18 of the polymer solution moves in a space is shortened, and the polymer nanofibers arrive at the collector 15 before a period of time required for sufficient volatilization elapses. In this case, as the minus voltage applied by the lower power source 16b increases, the force of attracting the jet 18 of the polymer solution to the collector 15 becomes larger, and hence the amount of the polymer nanofibers that arrive at the collector 15 in a shorter period of time increases. That is, the polymer nanofibers that arrive at the collector 15 in a state of containing the solvent in a large amount become dominant. When the polymer nanofibers in a state of containing the solvent in a large amount are accumulated on the collector 15 (or a support placed on the collector 15), a part of the fibers loses a fiber shape, and the density of a layer itself increases due to the weight of the polymer nanofibers forming the layer. The layer A 1a is formed through the above-mentioned process.

Then, the potential difference between the upper power source 16a and the lower power source 16b is returned to the optimum spinning condition by decreasing the minus voltage applied by the lower power source 16b or resetting the voltage of the lower power source 16b to zero under the application of the voltage. As a result, the polymer nanofibers that arrive at the collector 15 in a state of containing the solvent in a large amount are eliminated, and a layer in which only the polymer nanofibers are accumulated is formed. Thus, the layer B 1b is formed.

A change in voltage of each power source (16a, 16b) described above is performed while the spinning treatment is conducted. Therefore, the layer A 1a and the layer B 1b can be produced continuously.

After the polymer nanofibers are accumulated to form the layer B 1b, the solvent contained in the polymer nanofibers forming each layer (1a, 1b) is removed completely. As a specific solvent removal method, there are given a method involving placing the resultant in vacuum or under low humidity, a method involving sending air to the resultant, or the like. Thus, the porous laminate of the present invention is formed.

Now, the present invention is described in detail by way of Examples, but the present invention is not limited to Examples described below. Herein, a method of evaluating porous laminates produced in Examples and Comparative Examples described below is described.

[Structure Evaluation of Porous Laminate]

The process in which the porous laminates according to Examples or Comparative Examples are produced through use of the electrospinning method can be visually confirmed as long as the fiber diameter is several hundreds of nanometers or more.

Further, the porous laminate itself can be confirmed by direct observation with a scanning electron microscope (SEM) or a laser microscope measurement after production, irrespective of the size of the fiber diameter. In particular, in order to confirm how the state of the layers (layer A, layer B) forming the porous laminate in the lamination direction changes, it is effective to observe a fracture section from a sectional direction. In this case, in order to obtain a fracture section, a method involving cutting the porous laminate with a blade such as a knife, a method involving cutting the porous laminate by the application of an argon beam, or the like is effective.

Meanwhile, the average fiber diameter of the polymer nanofibers forming the porous laminate can be determined based on an image obtained by measuring the produced porous laminate with the scanning electron microscope (SEM) or a laser microscope. Specifically, the average fiber diameter can be determined by capturing the obtained image with image analysis software, and then measuring a width of the polymer nanofibers at arbitrary 50 points.

The existence ratio (average existence ratio) of the polymer nanofibers contained in each layer (layer A, layer B) forming the porous laminate can be calculated based on the image obtained by measuring the produced porous laminate with the scanning electron microscope (SEM) or the laser microscope. Specifically, the existence ratio can be calculated by capturing the obtained image with image analysis software, binarizing the image to classify the image into a polymer nanofiber existing portion and a polymer nanofiber non-existing portion, and calculating an area ratio of the polymer nanofiber existing portion based on an area of the entire image.

[Evaluation of Delamination Resistance in Porous Laminate]

It can be confirmed by a bending test whether or not the delamination resistance is improved in the porous laminates produced in Examples or Comparative Examples, as compared to the related art ones.

The bending test is a test for confirming whether or not delamination occurs after a sample is bent (whether or not the porous laminate is delaminated from the support). The state in which the produced porous laminate is in a planar shape is defined as a starting state, and a bending angle thereof is defined to be 0 degrees. An axis for bending the sample is determined in the starting state, and the porous laminate and the support are cut with a knife so that a fracture section in a portion of the axis can be seen. Then, (1) the sample is bent until 70 degrees from the original portion along the axis as a fulcrum, and (2) returned until 0 degree. (3) Then, the sample is bent until 70 degree (i.e., −70 degrees) in opposite direction to (1) through the bending angle of 0 degrees, and returned to the angle of 0 degrees. Such a series (1) to (3) of operations is defined as one cycle. The series of operations are repeated 20 cycles. After the operations, the fracture section of the porous laminate is observed for the presence or absence of delamination occurrence with the laser microscope. At a time of observation, the case in which no delamination occurs (a delaminated portion is not seen) is determined to be good, and the case in which delamination occurs (a delaminated portion is seen) is determined to be unacceptable.

The sample evaluated to be "good" in the above-mentioned evaluation is considered as a porous laminate in which delamination resistance is satisfactory, that is, a part of a structural body is not delaminated by the operations of applying a stress such as bending.

EXAMPLE 1

A porous laminate was produced through use of a production apparatus 10 of an electrospinning system illustrated in FIG. 2. In this example, NANON (manufactured by MECC Co., Ltd.) was used as the production apparatus 10. Further, a syringe with a metallic needle was used as the storage tank 12 of the polymer solution. Further, an aluminum plate was used as the collector 15. It should be noted that, in this example, the distance from the metallic needle 14 arranged at a tip end of the storage tank 12 of the head 17 to the collector 15 was set to 25 cm.

(1) Constituent Material of Polymer Nanofibers

As a constituent material of the polymer nanofibers, polyethylene oxide (PEO, manufactured by Sigma-Aldrich) and pure water were mixed to prepare 2 mL of a 6 wt % PEO aqueous solution. It should be noted that the PEO aqueous solution was poured into the syringe (storage tank 12) with the metallic needle 14.

(2) Support

As a support (underlying base material) to be placed on the collector 15 and used for producing a porous laminate, a polyamide imide film (PAI film) was used.

(3) Formation of Porous Laminate

In an electrospinning apparatus (production apparatus 10), the syringe (storage tank 12) filled with the PEO aqueous solution was mounted, and the apparatus setting was adjusted so that the extrusion speed of the PEO aqueous solution became 1 ml/hr. Specifically, first, a voltage of 20 kV was applied to the spinning nozzle 14 through use of the upper power source 16a, and a voltage of −10 kV was applied to the collector 15 through use of the lower power source 16b, to perform spinning for 4 minutes. It should be noted that the application voltage of the upper power source 16a was changed to 20 kV, and the application voltage of the lower power source 16b was changed to 0 kV, without turning off each power source (16a, 16b) after the completion of spinning for the first 3 minutes, and then spinning was performed for 15 minutes under this setting condition (see Table 1). After the spinning operation, the support having polymer nanofibers formed thereon was left in vacuum for 24 hours so as to remove the remaining solvent. Thus, a porous laminate was obtained in a state of being formed on the support. It should be noted that, in order to observe a fracture section of a porous structural body, the porous laminate formed on the support was placed in liquid nitrogen together with the support, and then the porous laminate was exposed to the atmosphere and split in two by the application of a stress.

(4) Evaluation Results of Porous Laminate

The porous laminate was observed with a laser microscope. As a result of the observation, it was able to be confirmed that a support, a layer (layer A) having a large existence ratio of the polymer nanofibers, and a layer (layer B) having an existence ratio of the polymer nanofibers smaller than that of the layer A were produced. Further, each portion of an image obtained from this observation was binarized, and the existence ratio of each layer (layer A, layer B) was calculated in terms of % based on the binarization results. The evaluation results of the thickness of each layer forming the porous laminate produced in this example, the existence ratio of the polymer nanofibers, and the like are shown in Table 2.

Figure 3:
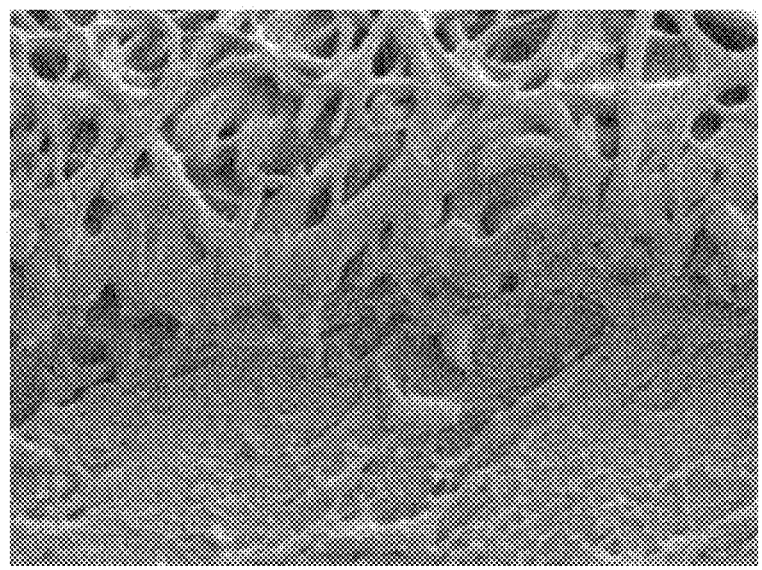
FIG. 3 is a SEM image (fracture section image) in the vicinity of an interface between a support and a layer A after a bending test.

Then, the delamination resistance was evaluated. As a result of the evaluation, in the porous laminate of this example, the delamination from the support was not confirmed, and hence the delamination resistance was determined to be "good". FIG. 3 is a SEM image (fracture section image) in the vicinity of an interface between the support and the layer A after the bending test.

EXAMPLE 2

A porous laminate was formed on a support through use of the same production apparatus as that of Example 1.

(1) Constituent Material of Polymer Nanofibers

As a constituent material of the polymer nanofibers, polyamide imide (PAI, VYLOMAX HR-13NX) and dimethylformamide (DMF) were mixed to prepare a polymer solution having a solid content concentration of 20 wt %. It should be noted that the polymer solution was poured into the syringe (storage tank 12) with the metallic needle 14.

(2) Support

As a support (underlying base material) to be placed on the collector 15 and used for producing a porous laminate, an aluminum foil was used.

(3) Formation of Porous Laminate

In an electrospinning apparatus (production apparatus 10), the syringe (storage tank 12) filled with the polymer solution was mounted, and the apparatus setting was adjusted so that the extrusion speed of the polymer solution became 1 ml/hr. Specifically, first, a voltage of 25 kV was applied to the spinning nozzle 14 through use of the upper power source 16a, and a voltage of −10 kV was applied to the collector 15 through use of the lower power source 16b, to perform spinning for 1 minute. Next, the application voltage of the upper power source 16a was changed to 25 kV, and the application voltage of the lower power source 16b was changed to 0 kV, without turning off each power source (16a, 16b) after the completion of the spinning, and then spinning was performed for 10 minutes under this setting condition (see Table 1). After the spinning operation, treatment was performed by the same method as that of Example 1. Thus, a porous laminate was obtained in a state of being formed on the support. It should be noted that, in order to observe a fracture section of a porous structural body, the porous laminate formed on the support was placed in liquid nitrogen together with the support, and then the porous laminate was exposed to the atmosphere and split in two by the application of a stress.

(4) Evaluation Results of Porous Laminate

As a result of the observation with a laser microscope, it was able to be confirmed that a support, a layer (layer A) having a large existence ratio of the polymer nanofibers, and a layer (layer B) having an existence ratio of the polymer nanofibers smaller than that of the layer A were produced. In addition, the thickness of each layer forming the porous laminate, the existence ratio of the polymer nanofibers, and the like were evaluated by the same method as that of Example 1. The results are shown in Table 2.

In addition, the delamination resistance was evaluated. As a result of the evaluation, in the porous laminate of this example, the delamination from the support was not confirmed, and hence the delamination resistance was determined to be "good".

EXAMPLE 3

A porous laminate was formed on a support through use of the same production apparatus as that of Example 1.

(1) Constituent Material of Polymer Nanofibers

As a constituent material of the polymer nanofibers, polyvinyl alcohol (PVA) and pure water were mixed to prepare a PVA aqueous solution having a solid content concentration of 5 wt %. It should be noted that the polymer solution was poured into the syringe (storage tank 12) with the metallic needle 14.

(2) Support

As a support (underlying base material) to be placed on the collector 15 and used for producing a porous laminate, a cellulose film (paper) was used.

(3) Formation of Porous Laminate

In an electrospinning apparatus (production apparatus 10), the syringe (storage tank 12) filled with the PVA aqueous solution was mounted, and the apparatus setting was adjusted so that the extrusion speed of the polymer solution became 0.5 ml/hr. Specifically, first, a voltage of 30 kV was applied to the spinning nozzle 14 through use of the upper power source 16a, and a voltage of −10 kV was applied to the collector 15 through use of the lower power source 16b, to perform spinning for 4 minutes. Next, the application voltage of the upper power source 16a was changed to 30 kV, and the application voltage of the lower power source 16b was changed to 0 kV, without turning off each power source (16a, 16b) after the completion of the spinning, and then spinning was performed for 15 minutes under this setting condition (see Table 1). After the spinning operation, treatment was performed by the same method as that of Example 1. Thus, a porous laminate was obtained in a state of being formed on the support. It should be noted that, in order to observe a fracture section of a porous structural body, the porous laminate formed on the support was placed in liquid nitrogen together with the support, and then the porous laminate was exposed to the atmosphere and split in two by the application of a stress.

(4) Evaluation Results of Porous Laminate

The porous laminate was observed with a laser microscope. As a result of the observation, it was able to be confirmed that a support, a layer (layer A) having a large existence ratio of the polymer nanofibers, and a layer (layer B) having an existence ratio of the polymer nanofibers smaller than that of the layer A were produced. In addition, the thickness of each layer forming the porous laminate, the existence ratio of the polymer nanofibers, and the like were evaluated by the same method as that of Example 1. The results are shown in Table 2.

In addition, the delamination resistance was evaluated. As a result of the evaluation, in the porous laminate of this example, the delamination from the support was not confirmed, and hence the delamination resistance was determined to be "good".

COMPARATIVE EXAMPLE 1

A porous laminate was obtained in a state of being formed on a support by the same method as that of Example 1 except that the voltages applied by the upper power source 16a and the lower power source 16b and the spinning time were set as shown in Table 1, and the voltages were not switched during spinning in the section (3) of Example 1. It should be noted that, in order to observe a fracture section of a porous structural body, the porous laminate formed on the support was placed in liquid nitrogen together with the support, and then the porous laminate was exposed to the atmosphere and split in two by the application of a stress.

The porous laminate was observed with a laser microscope. As a result of the observation, it was able to be confirmed that a layer, in which the structure of the polymer nanofibers forming the layer was substantially the same and the existence ratio of the polymer nanofibers was uniform, was produced on the support. Therefore, for convenience, a portion of the layer at a distance of up to 20 μm from the support was defined as a layer A, and a portion of the layer at a distance of more than 20 μm from the support was defined as a layer B. Further, the thickness of each layer forming the porous laminate, the existence ratio of the polymer nanofibers, and the like were evaluated by the same method as that of Example 1. The results are shown in Table 2.

In addition, the delamination resistance was evaluated. As a result of the evaluation, in the porous laminate of this example, the delamination from the support was confirmed, and hence the delamination resistance was determined to be "unacceptable".

COMPARATIVE EXAMPLE 2

A porous laminate was obtained in a state of being formed on a support by the same method as that of Example 1 except that the voltages applied by the upper power source 16a and the lower power source 16b and the spinning time were set as shown in Table 1, and the voltages were switched immediately after formation of the layer A in the section (3) of Example 1. It should be noted that, in order to observe a fracture section of a porous structural body, the porous laminate formed on the support was placed in liquid nitrogen together with the support, and then the porous laminate was exposed to the atmosphere and split in two by the application of a stress.

The porous laminate was observed with a laser microscope. As a result of the observation, it was able to be confirmed that a layer, in which the structure of the polymer nanofibers forming the layer was substantially the same and the existence ratio of the polymer nanofibers was substantially uniform, was produced on the support. Therefore, for convenience, a portion of the layer at a distance of up to 20 μm from the support was defined as a layer A, and a portion of the layer at a distance of more than 20 μm from the support was defined as a layer B. Further, the thickness of each layer forming the porous laminate, the existence ratio of the polymer nanofibers, and the like were evaluated by the same method as that of Example 1. The results are shown in Table 2.

In addition, the delamination resistance was evaluated. As a result of the evaluation, in the porous laminate of this example, the delamination from the support was confirmed, and hence the delamination resistance was determined to be "unacceptable".

COMPARATIVE EXAMPLE 3

A porous laminate was obtained in a state of being formed on a support by the same method as that of Example 2 except that the voltages applied by the upper power source 16a and the lower power source 16b during formation of the layer A and the spinning time were set as shown in Table 1 in the section (3) of Example 2.

The porous laminate was observed with a laser microscope. As a result of the observation, it was able to be confirmed that a layer, in which the structure of the polymer nanofibers forming the layer was substantially the same and the existence ratio of the polymer nanofibers was substantially uniform, was produced on the support. Therefore, for convenience, a portion of the layer at a distance of up to 20 μm from the support was defined as a layer A, and a portion of the layer at a distance of more than 20 μm from the support was defined as a layer B. Further, the thickness of each layer forming the porous laminate, the existence ratio of the polymer nanofibers, and the like were evaluated by the same method as that of Example 1. The results are shown in Table 2.

In addition, the delamination resistance was evaluated. As a result of the evaluation, in the porous laminate of this example, the delamination from the support was confirmed, and hence the delamination resistance was determined to be "unacceptable".

COMPARATIVE EXAMPLE 4

A porous laminate was obtained in a state of being formed on a support by the same method as that of Example 3 except that the voltages applied by the upper power source 16a and the lower power source 16b and the spinning time were set as shown in Table 1, and the voltages were not switched during spinning in the section (3) of Example 3. It should be noted that, in order to observe a fracture section of a porous structural body, the porous laminate formed on the support was placed in liquid nitrogen together with the support, and then the porous laminate was exposed to the atmosphere and split in two by the application of a stress.

The porous laminate was observed with a laser microscope. As a result of the observation, it was able to be confirmed that a layer, in which the structure of the polymer nanofibers forming the layer was substantially the same and the existence ratio of the polymer nanofibers was uniform, was produced on the support. Therefore, for convenience, a portion of the layer at a distance of up to 20 μm from the support was defined as a layer A, and a portion of the layer at a distance of more than 20 μm from the support was defined as a layer B. Further, the thickness of each layer forming the porous laminate, the existence ratio of the polymer nanofibers, and the like were evaluated by the same method as that of Example 1. The results are shown in Table 2.

In addition, the delamination resistance was evaluated. As a result of the evaluation, in the porous laminate of this example, the delamination from the support was confirmed, and hence the delamination resistance was determined to be "unacceptable".

TABLE 1

| | Constituent material of nanofibers | Support | Layer A | | | Layer B | | |
|---|---|---|---|---|---|---|---|---|
| | | | Upper voltage [kV] | Lower voltage [kV] | Spinning time [min] | Upper voltage [kV] | Lower voltage [kV] | Spinning time [min] |
| Example 1 | PEO | PAI film | 20 | −10 | 4 | 20 | 0 | 15 |
| Example 2 | PAI | Aluminum foil | 25 | −10 | 1 | 25 | 0 | 10 |
| Example 3 | PVA | Cellulose (paper) | 30 | −10 | 4 | 30 | 0 | 15 |
| Comparative Example 1 | PEO | PAI film | — | — | — | 18 | 0 | 15 |
| Comparative Example 2 | PEO | PAI film | 18 | 0 | 4 | 20 | 0 | 15 |
| Comparative Example 3 | PAI | Aluminum foil | 20 | 0 | 2 | 25 | 0 | 10 |
| Comparative Example 4 | PVA | Cellulose (paper) | — | — | — | 30 | 0 | 15 |

TABLE 2

|  | Layer A | | Layer B | | | |
| --- | --- | --- | --- | --- | --- | --- |
|  | Thickness [μm] | Existence ratio [%] | Thickness [μm] | Existence ratio [%] | Average fiber diameter [nm] | Evaluation of delamination resistance (Note 2) |
| Example 1 | 18 | 83 | 70 | 33 | 500 | Good |
| Example 2 | 4 | 80 | 60 | 35 | 800 | Good |
| Example 3 | 16 | 72 | 60 | 27 | 350 | Good |
| Comparative Example 1 | 20 (Note 1) | 32 | 50 | 32 | 500 | Unacceptable |
| Comparative Example 2 | 20 (Note 1) | 30 | 60 | 32 | 500 | Unacceptable |
| Comparative Example 3 | 20 (Note 1) | 28 | 40 | 35 | 800 | Unacceptable |
| Comparative Example 4 | 20 (Note 1) | 27 | 40 | 26 | 330 | Unacceptable |

(Note 1)
Thickness for convenience
(Note 2)
Evaluation by bending test

As described above, the porous laminate of the present invention is not delaminated from the support even when a physical load such as bending is applied to the porous laminate. Therefore, the porous laminate of the present invention can be used as a coating material of a flexible support such as paper, a polymer film, a metal foil, or the like. It should be noted that the porous laminate of the present invention can be a porous laminate having a high specific surface area, which can be used for a long period of time even when an external factor such as rubbing is applied, and hence the porous laminate of the present invention can be preferably used as, for example, a material for trapping or carrying fine particles.

As described above by way of the embodiments and Examples, according to the present invention, a porous laminate having satisfactory resistance to a mechanical load such as a bending stress while maintaining the characteristics of a porous structure can be provided. That is, the porous laminate of the present invention has satisfactory adhesiveness at an interface with respect to a support while maintaining the characteristics of the porous structure containing the polymer nanofibers, and the porous laminate of the present invention is not delaminated from the support at the interface with respect to the support even when the porous laminate is subjected to an operation of applying a stress such as bending.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-179814, filed Sep. 4, 2014, which is hereby incorporated by reference herein in its entirety.

What is claimed is:

1. A porous laminate, comprising: a layer A formed on a support, the layer A comprising a porous film containing polymer nanofibers; and
   a layer B formed on the layer A, the layer B comprising a porous film containing polymer nanofibers, wherein:
   an existence ratio of the polymer nanofibers contained in the layer A is larger than an existence ratio of the polymer nanofibers contained in the layer B; and
   a difference between the existence ratio of the polymer nanofibers contained in the layer A and the existence ratio of the polymer nanofibers contained in the layer B is more than 40%,
   wherein the existence ratio of the polymer nanofibers contained in the layer A is a ratio of a volume of the polymer nanofibers contained in the layer A to a volume of the layer A,
   wherein the existence ratio of the polymer nanofibers contained in the layer B is a ratio of a volume of the polymer nanofibers contained in the layer B to a volume of the layer B, and
   wherein the existence ratio of the polymer nanofibers contained in the layer A is 70% to 97%; and the existence ratio of the polymer nanofibers contained in the layer B is 10% to 45%.

2. The porous laminate according to claim 1, wherein a thickness of the layer A is larger than a fiber diameter of each of the polymer nanofibers contained in the layer B and is 20 μm or less.

3. The porous laminate according to claim 1, wherein a polymer material forming the polymer nanofibers comprises at least one selected from the group consisting of a polyolefin-based polymer, polystyrene, polyimide, polyarylene, and a fluorine-containing polymer.

4. The porous laminate according to claim 1, wherein a polymer material forming the polymer nanofibers comprises at least one of polyethylene oxide, polyamide imide, and polyvinyl alcohol.

* * * * *